United States Patent [19]
Kallin

[11] Patent Number: 5,745,860
[45] Date of Patent: Apr. 28, 1998

[54] METHOD AND SYSTEM OF DATA TRANSMISSION AND RECEPTION IN A MOBILE STATION WITHIN A RADIO TELECOMMUNICATIONS SYSTEM

[75] Inventor: Harald Kallin, Sollentuna, Sweden

[73] Assignee: Telefonaktiebolaget LM Ericsson, Stockholm, Sweden

[21] Appl. No.: 357,668

[22] Filed: Dec. 16, 1994

[51] Int. Cl.$^6$ .................. H04B 1/38; H04M 1/00
[52] U.S. Cl. ................ 455/574; 455/38.3; 455/343
[58] Field of Search ................ 455/38.3, 343, 455/33.1, 49.1, 54.1, 67.1, 422, 517, 550, 574, 575; 370/94.1, 311–313

[56] References Cited

U.S. PATENT DOCUMENTS

| | | | |
|---|---|---|---|
| 4,353,065 | 10/1982 | Mori | 340/825.44 |
| 4,449,248 | 5/1984 | Leslie et al. | |
| 4,506,386 | 3/1985 | Ichikawa et al. | 455/343 |
| 4,577,315 | 3/1986 | Otsuka | 455/68 |
| 4,736,461 | 4/1988 | Kawasaki et al. | 455/343 |
| 5,031,231 | 7/1991 | Miyazaki | 455/54 |
| 5,058,203 | 10/1991 | Inagami | 455/89 |
| 5,109,530 | 4/1992 | Stengel | 455/38.3 |
| 5,117,449 | 5/1992 | Metroka et al. | 379/58 |
| 5,128,938 | 7/1992 | Borras | 455/343 |
| 5,144,296 | 9/1992 | DeLuca et al. | 340/825.44 |
| 5,150,361 | 9/1992 | Wieczorek et al. | 370/95.1 |
| 5,173,927 | 12/1992 | Strömmer et al. | 375/81 |
| 5,175,874 | 12/1992 | Auchter | 455/343 |
| 5,193,091 | 3/1993 | Crisler et al. | 370/95.1 |
| 5,203,020 | 4/1993 | Sato et al. | 455/68 |
| 5,224,152 | 6/1993 | Harte | 379/59 |
| 5,230,084 | 7/1993 | Nguyen | 455/38.3 |
| 5,237,603 | 8/1993 | Yamagata et al. | 379/61 |
| 5,241,542 | 8/1993 | Natarajan et al. | 455/343 |
| 5,241,568 | 8/1993 | Fernandez et al. | 375/116 |
| 5,241,690 | 8/1993 | Larsson et al. | 455/54.1 |
| 5,252,963 | 10/1993 | Snowden et al. | 340/825.44 |
| 5,265,270 | 11/1993 | Stengel et al. | 455/343 |
| 5,274,843 | 12/1993 | Murai et al. | 455/38.3 |
| 5,291,542 | 3/1994 | Kivari et al. | 379/58 |
| 5,301,225 | 4/1994 | Suzuki et al. | 379/59 |
| 5,309,153 | 5/1994 | Gaskill et al. | 340/825.44 |
| 5,355,518 | 10/1994 | Kindinger et al. | 455/38.3 |
| 5,361,397 | 11/1994 | Wright | 455/343 |
| 5,483,672 | 1/1996 | Sasuta | 455/54.1 |

FOREIGN PATENT DOCUMENTS

| | | |
|---|---|---|
| 0 319 219 A2 | 6/1989 | European Pat. Off. |
| 0 375 067 A1 | 6/1990 | European Pat. Off. |
| 0 443 516 A2 | 2/1991 | European Pat. Off. |
| 0 522 631 A2 | 6/1992 | European Pat. Off. |
| 2 115 195 | 9/1983 | United Kingdom |
| WO 92/10042 | 6/1992 | WIPO |
| WO 93/22883 | 11/1993 | WIPO |

OTHER PUBLICATIONS

Joseph F. Focarile, et al., United States Statutory Invention Registration, Reg. No. H610, Published Mar. 7, 1989, "Cellular Pager", pp. 1–12.

*Primary Examiner*—Nguyen Vo
*Attorney, Agent, or Firm*—Jenkens & Gilchrist, P.C.

[57] ABSTRACT

A method and system of transmitting and receiving data in a mobile telecommunications system which reduces power consumption in mobile stations operating within the system. Mobile stations are divided into a plurality of sleep groups and a sleep message, which is transmitted in the control channel Overhead Message Train (OMT) as a Global Action Overhead Message (GAOM) is introduced. The bits of the sleep message contain data fields which indicate to mobile stations in each of the sleep groups when to monitor the control channel on which the sleep message was transmitted.

58 Claims, 6 Drawing Sheets

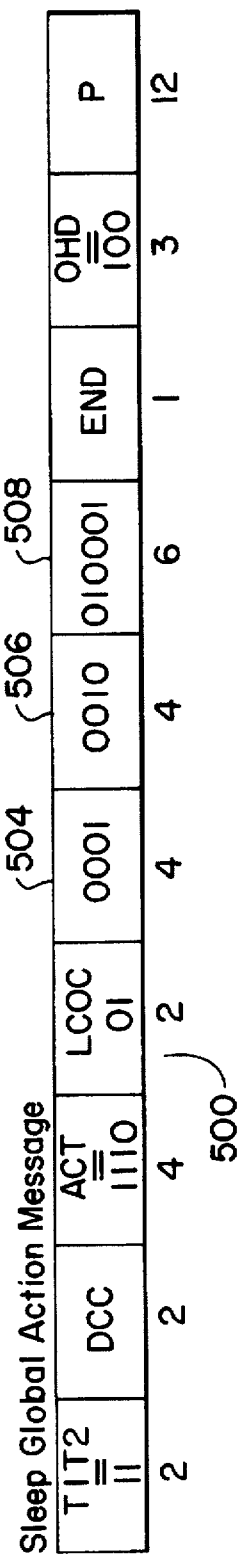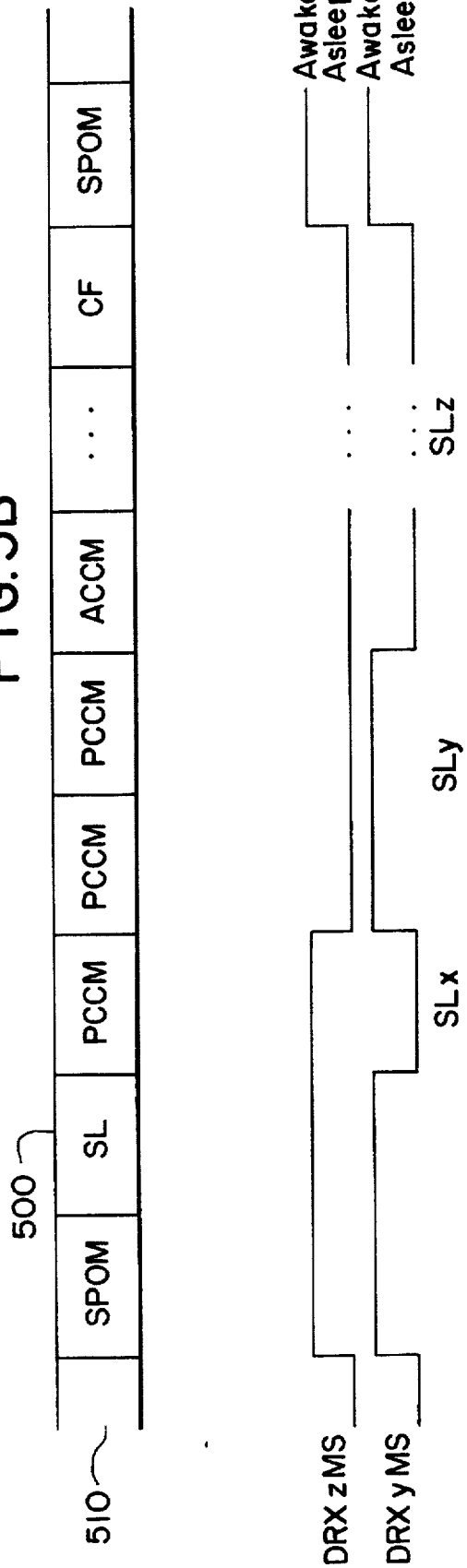
FIG.5A
FIG.5B
SPOM: System Parameter Overhead Message
SL: Sleep Message
PCCM: Paging Channel Control Message
ACCM: Access Channel Control Message
CF: Control Filler

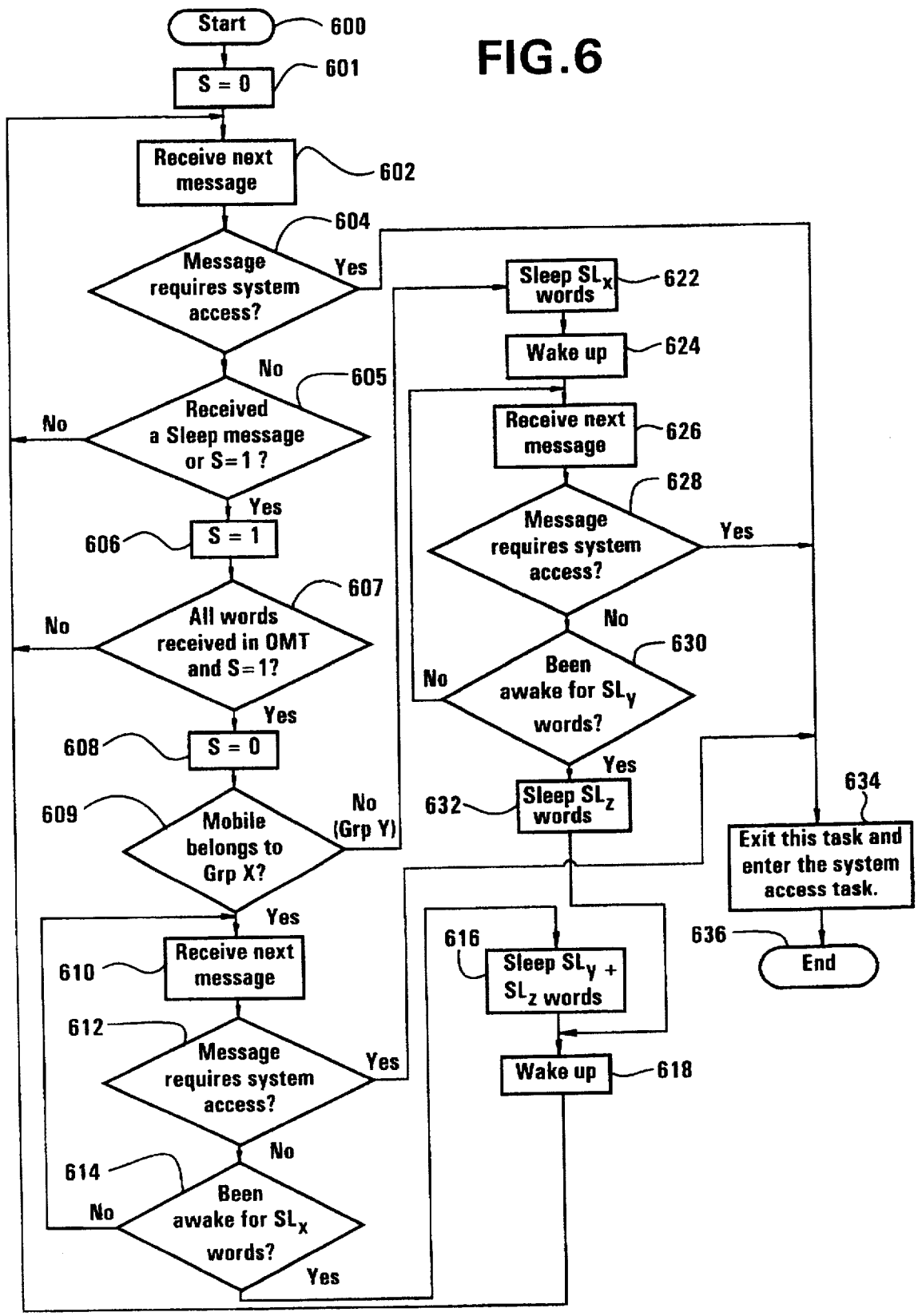

METHOD AND SYSTEM OF DATA TRANSMISSION AND RECEPTION IN A MOBILE STATION WITHIN A RADIO TELECOMMUNICATIONS SYSTEM

BACKGROUND OF THE INVENTION

1. Technical Field of the Invention

This invention relates to radio telecommunications systems, and more particularly, to a method of data transmission and reception which reduces the power consumption of a mobile station operating within a radio telecommunications system.

2. Description of the Related Art

In a radio telecommunications system, a mobile station may move about the geographic area served by the system while maintaining communications with the system. The communications between the mobile station and the system take place between transceivers in the mobile station and transceivers located in one or more fixed land site base stations. Each of the base stations has a separate coverage area or "cell" within the system. As the mobile station moves within the system, ongoing voice or data communications are maintained, and new communications can be initiated either by the system through a system base station, or by the mobile station. In a typical radio telecommunications system, each base station has a dedicated control channel on which the system transmits and receives messages necessary to keep track of the mobile station's location, and to implement communications between the mobile station and the system.

A mobile station involved in an ongoing voice or data communication may be said to be in an "active" mode. A mobile station which is not involved in an ongoing communication may be said to be in an "idle" mode. An idle mobile station must monitor the appropriate control channel of the system in which it is located in a manner such that the mobile station receives all system control messages addressed to it. This necessarily requires that the mobile station monitor the control channel during any time periods within which control messages directed to that mobile station could possibly be transmitted.

In existing mobile telecommunications systems, various methods of allocating control channels and time periods for transmission of control messages to mobile stations have been implemented. For example, systems designed under the relatively new GSM and D-AMPS IS-136 digital system specifications use time division multiplexed paging channels. Under these specifications, a mobile station only listens for control messages during specified time periods. The mobile station does not check control channel messages every time a message is sent. When the mobile station is not monitoring the control channel, power to the mobile station's receiver may be shut down. In systems of these types, the allocation of time periods in this manner is possible because of the relatively high data transmission rates utilized. These high data rates allow time periods to be allocated without significantly affecting the efficiency of transmitting control messages to an idle mobile station.

In other older systems such as the EIA/TIA-553 system (AMPS) or the Total Access Communications System (TACS), there was no provision for assigning time slots on the control channels to different mobile stations. This gross data rate for AMPS is only 10.0 kilobits/second, and the data rate for TACS is 8.0 kilobits/second. These gross data rates include transmission of all synchronization words, word repeats, and error coding bits. The actual information bit rate is closer to 1.2 kilobits/second for AMPS and 1 kilobit/second for TACS. This low information bit rate does not allow efficient allocation of time periods to a group of mobile stations. In AMPS and TACS, a mobile station may receive a control message on the control channel during any time period. The same control channel and same time periods are used to transmit control messages to more than one mobile station located within the range of a particular base station, thus each idle mobile station may spend a significant amount of time monitoring paging messages and other messages not intended for that particular mobile station. The amount of time spent monitoring these messages significantly reduces battery life in the mobile station.

Battery power is consumed in a mobile station in both the active and idle modes. In existing mobile stations such as, for example, cellular telephones, the battery has a life of approximately 2 hours in the active mode, and a life of 8–10 hours when idle and monitoring the control channel. The mobile station's receiver requires significant battery power and is constantly on when the mobile station monitors the control channel. Therefore, the power consumption in that mobile station's receiver, when the mobile station is monitoring paging messages, may be a significant percentage of the total power consumption. By reducing the time that a mobile station spends monitoring control messages not intended for that mobile station, the life of the mobile station's battery would be extended. It would be a significant advantage to have a method for reducing the monitoring time in an existing system in which no provision was designed into the system for allocating control channel paging slots to different mobile stations. The present invention provides such a method.

SUMMARY OF THE INVENTION

In the present invention, a new method and system of transmitting control messages to an idle mobile station within a cellular radio telecommunications system is introduced, with the object of the invention being to reduce battery power consumption in the mobile station. The inventive method and system is for use in an existing radio telecommunications system for which no provision for battery power saving during control channel monitoring is currently provided.

In a first aspect, the invention is a method and system for transmitting and receiving data in a cellular telecommunications system having one or more base stations and one or more mobile stations, each mobile station being assigned to a sleep group. A message group includes a sleep message containing data fields which indicate when mobile stations assigned to each sleep group should be in a "sleep" mode, and when mobile stations assigned to each sleep group should be in an "awake" mode. The sleep message is received at mobile stations, and the receiving mobile stations are operated in either the sleep mode or the awake mode in accordance with information contained in the data fields of the transmitted sleep message.

In another aspect of the invention, mobile stations are assigned to a first or second sleep group, and a sleep message is transmitted in a system overhead message train. Mobile stations in the first and second sleep groups receive the sleep message and then operate in the sleep or awake mode for a time interval determined by data in the sleep message.

In another aspect of the invention, a local control message which includes Local Control Option Code (LCOC) bits and data, is transmitted in an overhead message train on a base station control channel and is received at a mobile station.

The mobile station then determines from the LCOC bits that the local control message is a sleep message, and operates in sleep or awake mode according to the data included in the sleep message and the sleep group to which the mobile station is assigned.

In still another aspect of the invention, a global action overhead message which includes Global Action Code (ACT) bits and data, is transmitted in an overhead message train on a base station control channel and is received at a mobile station. The mobile station then determines from the ACT bits that the local control message is a sleep message, and operates in sleep or awake mode according to the data in the sleep message and the sleep group to which the mobile station is assigned.

In a still further aspect of the invention, the method and system is implemented for use on the control channel of an AMPS/TACS type system.

BRIEF DESCRIPTION OF THE DRAWINGS

For a more detailed understanding of the present invention, and for further objects and advantages thereof, reference can now be had to the following description, taken into conjunction with accompanying drawings, in which:

FIG. 5A illustrates an example of an Global Action Overhead Local Control sleep message in which the SLx, SLy and SLz fields have been configured to indicate a number of words for sleep and awake times;

FIG. 5B illustrates an Overhead Message Train data stream containing the sleep message of FIG. 4A and its relationship in time with the awake and sleep periods of DRX mobile stations divided into groups x and y;

FIG. 6 is a flow diagram which illustrates steps performed according to the inventive process when the invention is implemented in an AMPS/TACS system.

DETAILED DESCRIPTION OF THE INVENTION

Figure 1:
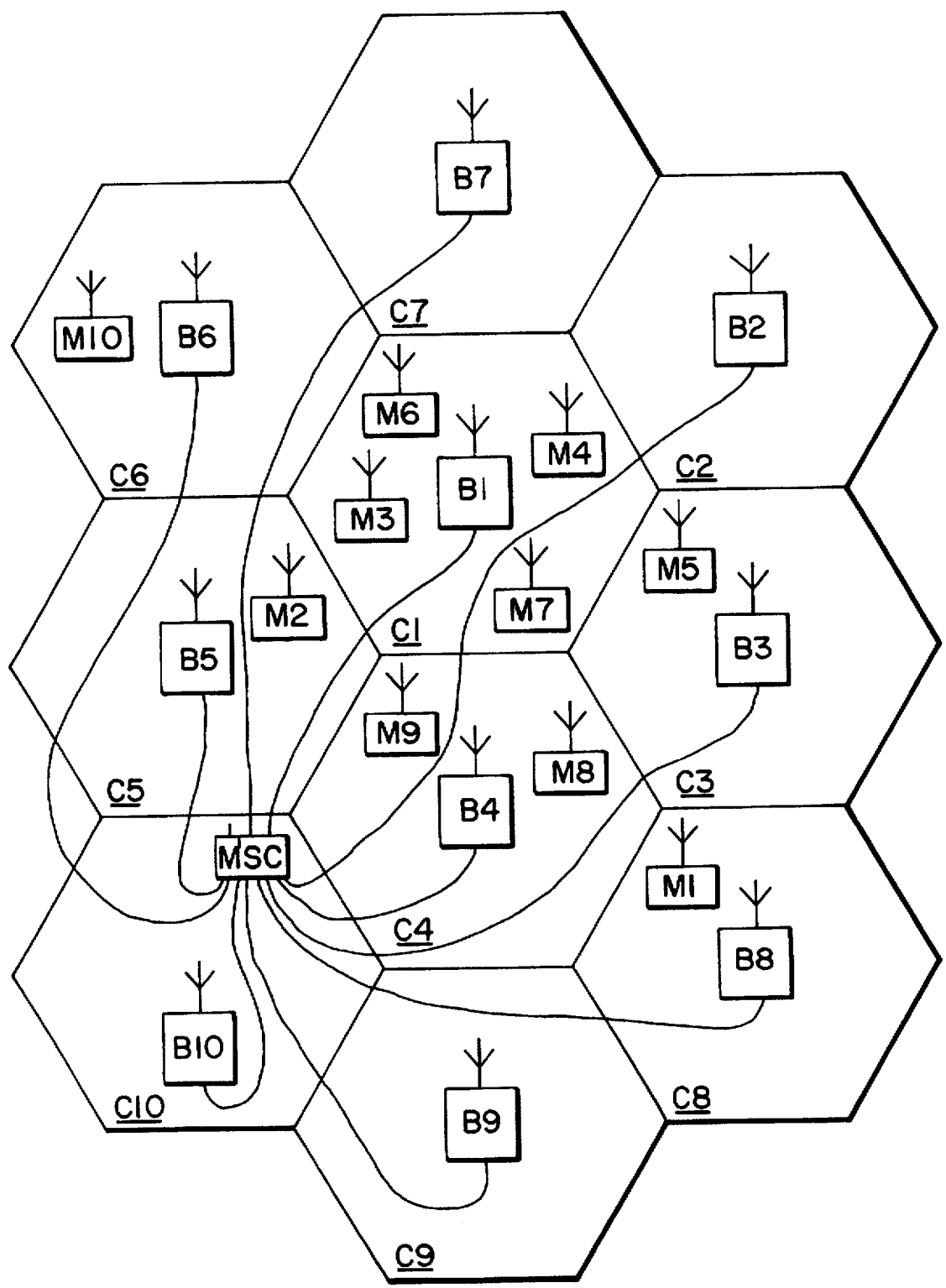
FIG. 1 is a block diagram illustrating a cellular radiotelephone system within which the present invention may be implemented.

Referring to FIG. 1, there is illustrated a conventional cellular radio communication system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of the cellular radio system, the base stations B1–B10 may be located near the periphery, or otherwise away from the center of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend in practice on the individual desires of the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile station switching center MSC. A mobile station switching center MSC is connected by communication links, e.g., cables, to each of the illustrative base stations B1–B10 and to the fixed public switched telephone network PSTN, not shown, or a similar fixed network which may include an integrated system digital network (ISDN) facility. The relevant connections between the mobile station switching center MSC and the base stations B1–B10, or between the mobile station switching center MSC and the PSTN or ISDN, are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching centers via cable or radio links.

Each MSC may control in a system the administration of communication between each of the base stations B1–B10 and the mobile stations M1–M10 in communication with it. As a mobile station roams about the system, the mobile station registers its location with the system through the base station that controls the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station scans system access channels and sends a page response to the base station from which it received the strongest access channel signal. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of the cells C1–C10 is allocated a plurality of voice or speech channels and at least one control channel, such as a forward control channel (FOCC). The control channel is used to control or supervise the operation of mobile stations by means of information transmitted to and received from those units. Such information may include incoming call signals, outgoing call signals, page signals, page response signals, location registration signals and voice channel assignments.

The present invention involves a method and system of implementing discontinuous mode reception (DRX) into an existing cellular telecommunications system during idle mobile station reception and monitoring of the control channel. In the preferred embodiment of the invention, the method and system is implemented into a telecommunication system using a control channel which operates according to either the EIA/TIA-553 (AMPS) system specification, the EIA/TIA IS-54C (IS-54C) system specification, the EIA/TIA-136.2 system specification, or the TACS system specification. These five system specifications are hereby incorporated by reference and will be referred to hereafter as AMPS/TACS systems. The control channels of these systems operate in a nearly identical manner, with the major difference being a narrower radio channel in TACS (25 kHz vs 30 kHz) with a corresponding down-scaling of related radio parameters, e.g., a 10 kilobit/second data transmission rate in the first four mentioned systems, which are AMPS type systems, as opposed to an 8 kilobit/second data transmission rate in TACS. For purposes of the present invention, the operation of the control channels in these systems can be considered identical. This invention has application to any system using control channels that operate in a similar mode.

In the preferred embodiment of the present invention, an idle mobile station only monitors and receives control messages which are transmitted by the telecommunication system to a group of mobile stations, termed a "sleep group", of which the idle mobile station is a member. Whenever the mobile station is receiving and monitoring control messages, it is said to be in a mode termed "awake," and the receiver is drawing battery power necessary for reception. When control channel messages are transmitted by the system base station to a different sleep group of which the idle mobile station is not a member, or when the transmitted messages are not pertinent for idle mobile stations, the mobile station does not receive and monitor these messages. During this time, the idle mobile station is allowed to go into a "sleep" mode. In sleep mode, the mobile station's receiver power can be shut off and only an internal timer for timing the sleep interval is powered. The system base station transmits control messages at predetermined times, within the constraints of the telecommunication system.

In AMPS/TACS mobile station telephone systems, a base-to-mobile station forward control channel (FOCC) is used to transmit control information to mobile stations. Each base station has a dedicated FOCC on which it transmits to mobile stations operating within its control area. The FOCC carries a continuous wideband data stream from the base station to the mobile stations. The data stream is generated at a 10 kilobit/second ±0.1 bit/second rate for AMPS, or at an 8 kilobit/second ±0.08 bit/second rate for TACS. Each FOCC carries three discrete data information streams, called the A stream the B stream, and the busy idle stream that are time-multiplexed together. Messages to mobile stations with the least significant bit of their mobile station identification number (MIN) equal to '0' are sent on stream A, and messages to mobile stations with the least significant bit of their MIN equal to '1' are sent on stream B. The busy-idle stream contains busy-idle bits which are used to indicate the current status of the reverse control channel. Each mobile station monitors the appropriate data stream according to the least significant bit of its MIN.

Figure 2:
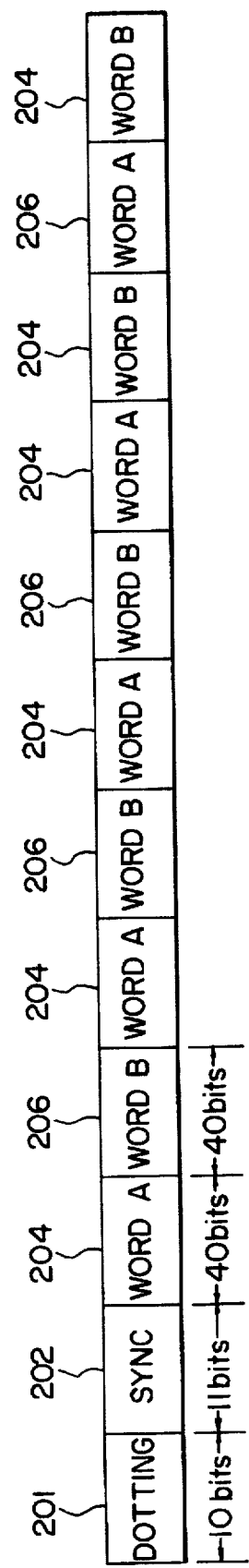
FIG. 2 illustrates A and B message streams transmitted on the AMPS/TACS forward control channel.

FIG. 2 illustrates how the message streams may be transmitted on the AMPS/TACS FOCC in one embodiment of the present invention. A 10-bit dotting sequence 201 and an 11-bit synchronization word sequence 202 are sent to enable mobile stations to synchronize to incoming FOCC data transmitted as binary coded words. Each word contains 40-bits, including 12 parity bits, and is repeated 5 times. Each set of 5 repetitions of a word is called a word block. Each A stream word 204 and B stream word 206 are time-multiplexed as shown.

A mobile station in idle mode, and ready to receive calls, monitors the FOCC for control channel messages addressed to it. These messages may include paging messages, audits, System Parameter Overhead Messages (SPOM), a Global Action Overhead Message (GAOM), a Registration Identification message (REGID), or a control filler message (CF). Upon receipt of a control channel message addressed to it, the mobile station initiates the function specified in the control message. Certain of these messages, for example a paging or audit message, may require the mobile station to access a radio channel for further communication with the base station.

The SPOM, GAOM, REGID, and CF messages are overhead messages sent in a group which is termed an Overhead Message Train (OMT) and is transmitted every 0.8±0.3 seconds for AMPS systems or 0.95±0.3 seconds for TACS systems. Each OMT contains a SPOM as the first two words and may optionally be followed by other overhead messages. Control messages addressed to a certain mobile station may be inserted anywhere between the OMT transmissions. CF messages are transmitted if there is nothing else to send.

In AMPS/TACS, each idle mobile station must listen to all messages on the FOCC because it is not known when a message intended for a particular mobile will appear, or when an OMT will be received that may contain system registration information or a new parameter setting. Functionally the FOCC may be considered as being divided into a paging channel on which paging messages, overhead messages, and audits are transmitted, and an access channel on which access messages are transmitted.

Figure 3:
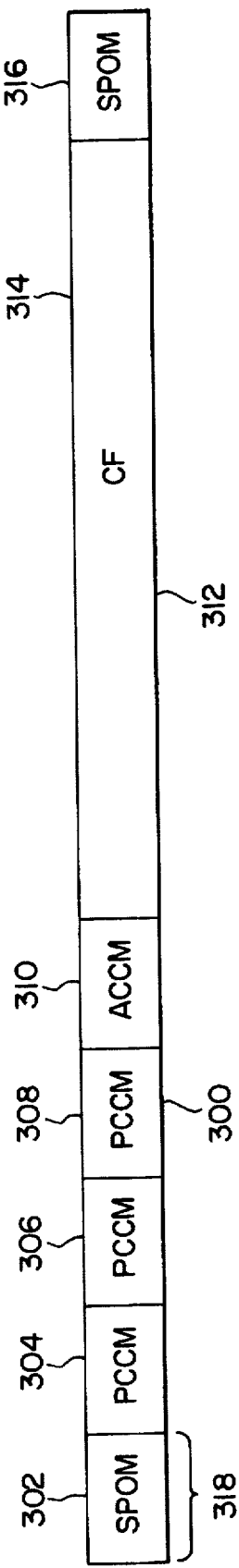
FIG. 3 illustrates an example of an AMPS/TACS forward control channel data stream.

The preferred embodiment of the present invention involves introducing discontinuous mode reception (DRX) during mobile station reception of the FOCC to reduce the time a mobile station spends monitoring the control channel. FIG. 3 illustrates an example of an AMPS/TACS FOCC data stream 300. The FOCC data stream 300 comprises a system parameter overhead message (SPOM) 302 followed by a number of 40-bit words comprising various types of messages. For illustrative purposes, the FOCC data stream in FIG. 3 contains paging messages (PCCM) 304, 306, 308, an Access Message (ACCM) 310, and Control Filler words (CF) 312. SPOM 316 begins a new OMT. In FIG. 3, an OMT 318 is comprised of the SPOM 302. The PCCMs 304, 306, and 308, and ACCM 310 messages are added after the OMT 318. Each SPOM 302 and 316 is made up of two words. FIG. 3 illustrates the AMPS/TACS FOCC data stream 300 as it is received from the A or B data stream.

Existing AMPS/TACS mobile stations listen to all messages on the FOCC. For example, in an existing AMPS/TACS system, the FOCC data stream 300 of FIG.3 may be broadcast by a base station to 10 mobile stations within that base station's coverage area that are monitoring stream A data on the FOCC for control messages. Each of the ten mobile stations monitors the complete FOCC data stream 300 for a control message which may be addressed to that particular mobile station even though the FOCC data stream 300 contains no message for it. Thus a mobile station may spend a significant amount of time monitoring messages addressed to different mobile stations.

In the present invention, mobile stations assigned to each control channel group, A or B, are divided into a number of sleep groups, which in the preferred embodiment is two groups. The groups are termed sleep group x and sleep group y. Mobile stations are assigned to a group depending on the next to the last bit of their MIN, with mobile stations having a next to last MIN bit of 0 being assigned to sleep group x, and mobile stations having a next to last MIN bit of 1 assigned to sleep group y.

DRX is implemented by introducing a sleep message which is transmitted in the OMT of the FOCC. The sleep message may be transmitted in the existing Global Action Overhead Message (GAOM) local control message. The GAOM local control message is a message containing a 16-bit data field. The local control message allows implementation in an AMPS/TACS system of local control functions not defined by the AMPS or TACS specifications. A LCOC field in the GAOM local control message identifies the type of local control message received. As an alternative, the sleep message may be transmitted as a new Global Action Overhead Message (GAOM). GAOM and GAOM local control messages are described in detail in the AMPS/TACS specifications and are known to those skilled in the art, therefore no further description is deemed necessary herein.

Figure 4B:
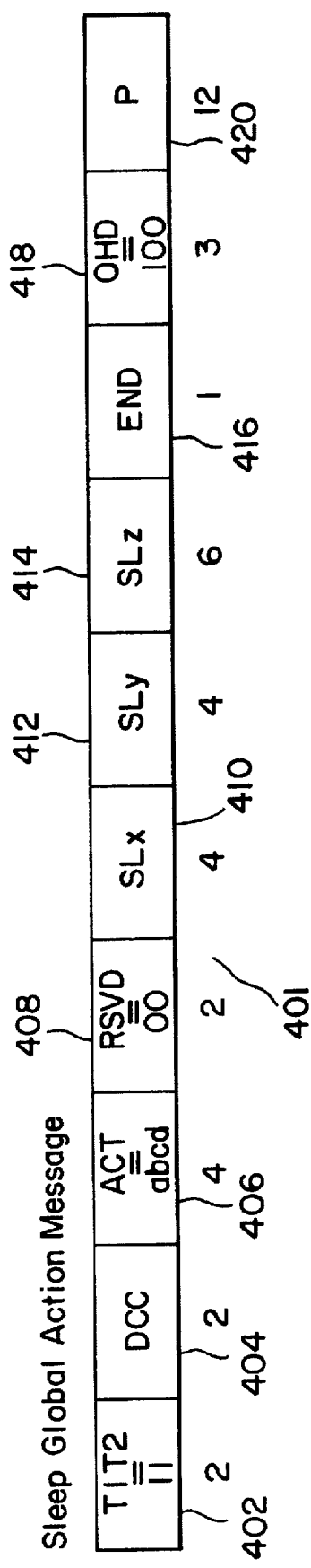
FIG. 4B illustrates a sleep message implemented as a Global Action Overhead Message.
Figure 4A:
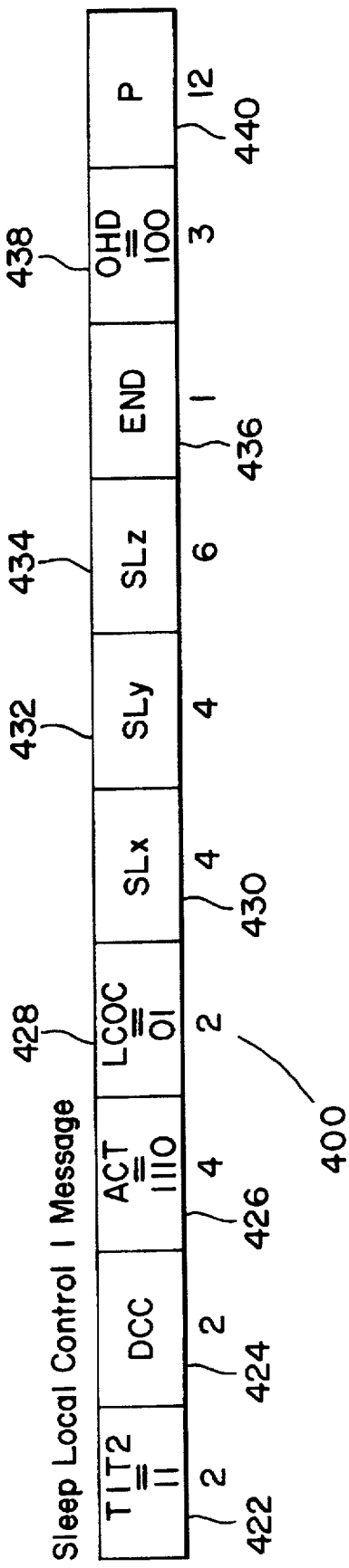
FIG. 4A illustrates a sleep message implemented as a Global Action Overhead Local Control message.

FIG. 4A illustrates the sleep message when implemented as a GAOM Local Control message, and FIG. 4B illustrates the structure of a sleep message when implemented as a new Global Action Overhead Message. The sleep message implemented as a new GAOM Local control message 400 of FIG. 4A contains the standard GAOM message fields T1T2 422, DCC 424, Global Action Code (ACT) bits 426, END 436, OHD 438 and P 440, plus 16 local control bits including Local Control Option Code (LCOC) 428, SLx 430, SLy 432 and SLz 434. The ACT 426 field is set to its local control message value of 1110. The LCOC field setting of 01 identifies the message as a sleep message. The 14 information bits following the LCOC field contain the special fields SLx 430, SLy 432 and SLz 434, with SLx 430 containing 4 bits, SLy 432 containing 4 bits, and SLz 434 containing 6 bits. The sleep message implemented as a new GAOM 401 of FIG. 4B contains the standard GAOM message fields T1T2 402, DCC 404, ACT 406, RSVD 408, END 416, OHD 418 and P 420 plus special fields SLx 410, SLy 412 and SLz 414. The ACT field is set to a value to identify the message as a sleep message. This value must be a value that is not used to identify any other GAOM message, such as a ACT field reserved for future use by the EIA/TIA-553 Specification. The 14 information bits following the RSVD field 408 contain the special fields SLx 410, SLy 412 and SLz 414, with SLx 410 containing 4 bits, SLy 412 containing 4 bits, and, SLz 414 containing 6 bits.

A mobile station receiving the OMT examines the words therein. A mobile station operating in the DRX mode of the invention recognizes a sleep message by examining the LCOC 428 bits of the GAOM local control message 400 or ACT 426 field of the GAOM message 401. Upon determining that a sleep message is included in the OMT, the mobile station then examines the SLx 430, SLy 432, and SLz 434 fields to determine the binary value of each field. In the described embodiment of the invention, the binary value of each field indicates a number of words, SLx words, SLy words and SLz words. These values indicate to the mobile station the times that the mobile station must monitor the FOCC to receive all PCCMs intended for mobile stations in the sleep group of which the mobile station is a member. For example, mobile stations in group x monitor the FOCC for SLx words after the last word in the OMT and then sleep for SLy+SLz words. Mobile stations in group y sleep for SLx words after the last word in the OMT, monitor the FOCC for SLy words, and then return to sleep for SLz words. In an alternative embodiment of the invention these binary values, in the SLx 430, SLy 432, and SLz 434 fields, may indicate a number of bits or, the length of a time period.

FIG. 5A illustrates an example of a GAOM Local control sleep message 500 in which the SLx 504, SLy 506, and SLz 508 fields have been configured to indicate a number of words. FIG. 5B illustrates a FOCC data stream 510 containing the sleep message 500 of FIG. 5A and its relationship in time with the awake periods and sleep periods of DRX mobile stations divided into groups x and y. Upon receiving the sleep message 500 of the OMT 510, mobile stations in group x monitor the FOCC 510 for 1 word, and then sleep for 19 words following the sleep message. Mobile stations in group y sleep for 1 word, monitor the FOCC 510 for 2 words, and then return to sleep for 17 words.

Figure 7:
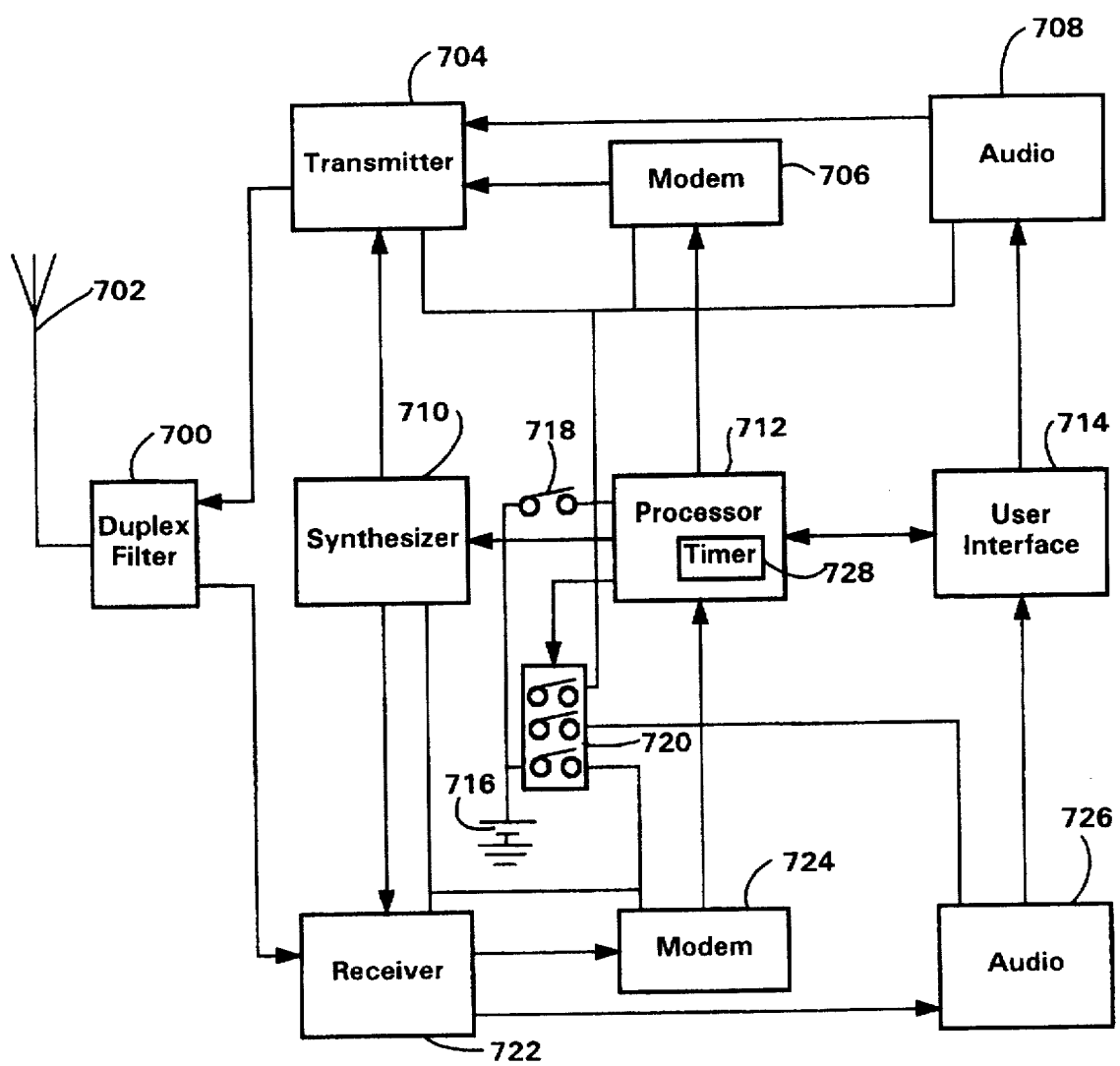
FIG. 7 is a schematic block diagram of a mobile station which operates according to the invention.

FIG. 7 is a block schematic diagram of a mobile station which is suitable for operation with the present invention. The mobile station includes a duplex filter 700, antenna 702, transmitter 704, transmitter modem 706, receiver modem 724, transmitter audio circuitry 708, receiver audio circuitry 726, frequency synthesizer 710, processor 712, user interface 714(including a speaker, microphone, keypad and display which are not shown), battery 716, user controlled power switch 718, processor controlled power switch 720, receiver 722 and a timer 728.

The duplex filter 700 allows the transmitter 704 to transmit and the receiver 722 to receive on the single antenna 702. The frequency synthesizer 710 sets the frequencies for transmission and reception and is controlled by the processor 712. For purposes of the invention, the duplex filter 700 is set to allow the receiver 722 to receive a signal on the antenna 702, and the processor 712 sets the frequency synthesizer 710 so that the receiver 722 receives control channel transmissions from the system. The processor 712 is able to turn off the power supplied from the battery 716 to the receiver 722, the receiver modem 724, the receiver audio circuitry 726 and the synthesizer 710 by controlling processor controlled switch 720.

FIG. 6 is a flow diagram which illustrates the steps taken within the mobile station of FIG. 7 when the invention is implemented in an AMPS/TACS system. The process begins at Step 600 when the mobile station is powered up by the user switching on power from the battery 716 to the mobile station through switch 718, or the mobile returns to the paging channel after a system access. The process may also begin when the mobile station returns from a voice channel and begins receiving transmissions on the paging channel of the FOCC. At step 601 a "sleep message received" flag is set to zero in the processor 712. At Step 602 a message is received from the telecommunications system at the receiver 722 on the antenna 702, and transferred to the processor 712 through modem 724. From Step 602 the process flow moves to Step 604 where it is determined by the processor 712 if the message requires system access by the receiving mobile station. If the message requires immediate system access by the mobile station, the process moves to Step 634, enters the system access task, and ends the idle mode. A message requiring system access may be, for example, an OMT message train, a REGID, or a paging message addressed to an individual mobile station. If however, at Step 604, it is determined that the message does not require system access by the receiving mobile station, the process moves the process moves to Step 605. At Step 605 the processor 712 determines if the message was a sleep message or if the sleep flag is set to 1. If the message was not a sleep message or the sleep flag is not set to 1, the process returns to Step 602 where the next message is received. If the message was a sleep message or the sleep flag was set to 1, the process flow continues to Step 606. At Step 606 the sleep flag in processor 712 is set to 1. If the sleep flag was not set previously, the sleep flag is now set to 1 at Step 606 because a sleep message was received where process flow moves to Step 607 where the processor 712 determines if all overhead messages in the OMT have been received by checking the end bits of the overhead messages and checking whether the sleep flag is set to 1. This check avoids going into the sleep mode before all overhead messages are received. If it is determined, at Step 607 that all overhead messages in an OMT have not been received or that the sleep flag is not set, the process flow returns to Step 602 and the processor 712 examines the next FOCC message which is received by the receiver 722.

If, at Step 607 it is determined that the last word of an OMT has been received, and one of the words therein was a sleep message, the process flow moves to Step 608 where the sleep flag is reset to zero in the processor 712. The process flow then moves to Step 609. The preferred embodiment uses the sleep flag, but if the sleep message is always sent as the last word of an OMT, Steps 601, 606, 607, 608 and the sleep flag check can be excluded. At Step 609, the process flow branches depending on whether or not the mobile station belongs to sleep group x. At this point the processor 712 also starts the timer 728.

If the mobile station belongs to sleep group x, the process flow moves from Step 609 to Step 610 where the next message on the FOCC is received. From Step 610 the process flow then moves to Step 612 where the processor 712 determines if the message requires system access by the receiving mobile station. If the message requires system access by the receiving mobile station, the process flow moves to Step 634, and the processor 712 enters the system access task, and ends the idle mode. If however, at Step 612 it is determined that the message does not require system access by the receiving mobile station, the process flow moves to Step 614.

At Step 614 the processor 712 checks the timer 728 to determine if the mobile station has been awake for a time period within which SLx words have been received. If the mobile station has not been awake for a time period within which SLx words have been received, the process flow returns to Step 610 and the next FOCC message is received. If however, at Step 614 it is determined that the mobile station has been awake for a time period within which SLx words have been received, the process flow moves to Step 616. At Step 616 the processor 712 activates sleep mode for the mobile station by switching off power from the battery 716 to the receiver 722, the receiver modem 724, the receiver audio circuitry 726, and the synthesizer 710, through switch 718 for a time period corresponding to the time necessary to receive the next SLy and SLz words on the FOCC. After a time corresponding to the next SLy and SLz words, the process flow moves to Step 618 where the mobile station is switched into the awake mode by the processor switching on power from the battery 716 to the receiver 722, the receiver modem 724, the receiver audio circuitry 726, and the synthesizer 710, through switch 718. From Step 618 the process flow returns to Step 602 and the next message is received on the control channel.

If, at step 609 it was determined that the mobile station belongs to sleep group y, the process flow instead moves from Step 609 to Step 622. At Step 622 the processor switches the mobile station into sleep mode for a time period corresponding to the time necessary to receive the next SLx words on the FOCC. After SLx words have been received according to the timer 728, the process flow moves to Step 624. At Step 624 the mobile station is switched into the awake mode by the processor switching on power from the battery 716 to the receiver 722, the receiver modem 724, and the synthesizer 710, through switch 718. From Step 624 the process flow moves to Step 626. At Step 626, the FOCC message which follows the last word of the OMT is by SLx words is received. At Step 628, the processor 712 determines if this message requires system access by the receiving mobile station. If the message requires system access, the process flow moves to Step 634 and the processor 712 enters the system access task and ends the idle mode. If however, at Step 628, it is determined that the message does not require system access, the process flow moves to Step 630 where the processor 712 determines if the mobile station has been awake for a time period corresponding to the time necessary to receive SLy words. If, at Step 630, the processor 712 determines the mobile station has not been awake for SLy words received, the processor 712 returns to Step 626 to receive the following FOCC message word. If however, at Step 630, the processor 712 determines the mobile station has been awake for a time period corresponding to SLy words received, the process flow moves to Step 632 where the processor 712 switches the mobile station into sleep mode for the next SLz words received by switching power off from the battery 716 to the receiver 722, the receiver modem 724, and the synthesizer 710, through switch 720.

After SLz words are received, the process flow moves to Step 618 where the mobile station is switched into the awake mode by switching on power from the battery 716 to the receiver 722, the receiver modem 724 and the synthesizer 710, through switch 720. From Step 618 the process flow moves back to Step 602 and the next word on the control channel is received.

Implementation of the invention on the FOCC achieves a significant reduction in the amount of time the receiver must be powered. If there are very few paging and overhead messages being transmitted by the system, the mobile stations in each sleep group need to be awake only during a small portion of their total idle time. For example, if the OMTs are started every twentieth word, and there is only 1 paging message sent to each group during the time between OMTs, the mobile stations need only stay awake for 4 out of 20 words. That is, the mobile stations need only monitor the 2 word SPOM, the sleep messages, and the paging message for their assigned group. This awake time would be 4/20, or 20% of the total time. Theoretically, if the mobile station did not require battery power at all during sleep mode, this would result in a battery life extension of 5 times. With a typical mobile station requiring the battery to provide 50 mA of current in the awake mode and 15 mA of current in sleep mode, the average current drain would be ($\frac{1}{5} \times 50$)+($\frac{4}{5} \times 15$) =22 mA. This reduction in current drain would correspond to a battery life extension of (50/22) or 2.3 times.

Base stations and mobile stations for mobile telecommunications systems include processors and circuitry capable of the necessary processing for implementation of the invention. As will be understood, many types of circuitry can be used when implementing the invention. The selection of an appropriate circuitry for use in a particular stage of the inventive method is within the knowledge of those skilled in the art and depends on the manufacturers and operators of the system, and the manufacturers of the mobile station.

Implementation of the invention into the AMPS/TACS system provides a capability not presently available in AMPS/TACS systems. The invention allows a flexible approach to controlling the various sleep groups for each separate OMT sent by a base station on the control channel, and each OMT can be uniquely configured. The invention allows redefinition of sleep and awake times for each new OMT sent. One advantage of this method is that sleep times can be defined with call traffic requirements in mind. If the volume of control messages to a certain sleep group becomes greater than the volume to the other sleep groups, the group with the greater volume can be instructed to remain in the awake mode for a longer period. If the volume of control messages to this certain group then decreases to a volume less than the volume to the other sleep groups, the sleep message can instruct the group with lesser volume to remain in the awake mode for a shorter time. The system dynamically adjusts and saves battery power in individual mobile stations by using the inventive method.

It is believed that the operation and construction of the present invention will be apparent from the foregoing description and, while the method and shown and described herein has been characterized as being preferred, obvious changes and modifications may be made therein without departing from the spirit and scope of the invention as defined in the following claims.

What is claimed is:

1. A method of reducing power consumption in a mobile station operating within a radio telecommunications system having a base station and a plurality of mobile stations assigned to a plurality of sleep groups, said method comprising the steps of:

receiving at said mobile station, a repetitively broadcast overhead message train transmitted on a base station control channel, said message train including a sleep message containing one or more data fields, said data fields including information indicating when mobile stations assigned to each sleep group of said plurality of sleep groups are to switch to a sleep mode and to an awake mode effective during a time period until a start of a next repetition of said broadcast message train; and operating said receiving mobile station in said sleep mode and said awake mode in accordance with said information contained in said data fields during the time period until the start of the next repetition of said broadcast message train.

2. The method of claim 1 in which each of said plurality of mobile stations is assigned to a first or second sleep group depending upon the numerical value of the next to the last bit of each of said mobile station's Mobile Station Identification Number.

3. The method of claim 1 wherein said sleep message is a local control message.

4. The method of claim 3 wherein said data fields are contained in the local control bits of said local control message.

5. The method of claim 1 wherein said sleep message is a global action overhead message.

6. The method of claim 1 wherein said data fields comprise a first, second and third field of bits and said plurality of sleep groups comprises a first and a second sleep groups, and said step of operating said receiving mobile station further comprises the step of:

operating said receiving mobile station in said awake mode for a first time interval effective during the time period until the start of the next repetition of the overhead message train determined by said first field of bits and in said sleep mode for another time interval effective during the time period until the start of the next repetition of the overhead message train determined by said second and third fields of bits if said receiving mobile station is assigned to said first sleep group.

7. The method of claim 6 wherein said step of operating said receiving mobile station includes:

operating said receiving mobile station in said sleep mode for the first time interval effective during the time period until the start of the next repetition of the overhead message train determined by said first field of bits, in said awake mode for a second time interval effective during the time period until the start of the next repetition of the overhead message train determined by said second field of bits, and in said sleep mode for a third time interval effective during the time period until the start of the next repetition of the overhead message train determined by said third field of bits if said receiving mobile station is assigned to said second sleep group.

8. The method of claim 1 in which said radio telecommunications system comprises an AMPS type system.

9. The method of claim 1 in which said radio telecommunications system comprises a TACS system.

10. A method of reducing power consumption in a mobile station operating within a radio telecommunications system having one or more base stations and a plurality of mobile stations, said method comprising the steps of:

assigning each of said plurality of mobile stations having a next to the last bit equal to 0 in its Mobile Station Identification Number to a first group and each of said plurality of mobile stations having a next to the last bit equal to 1 in its Mobile Station Identification Number to a second group;

receiving at each of said plurality of mobile stations, a sleep message transmitted in a repetitively broadcast overhead message train of a base station control channel, said sleep message comprising a first data field;

operating said receiving mobile stations assigned to said first group in an awake mode for a first time interval effective during a time period until a start of a next repetition of the overhead message train as determined by said first data field; and operating said receiving mobile stations assigned to said second group in a sleep mode for the first time interval effective during the time period until the start of the next repetition of the overhead message train as determined by said first data field.

11. The method of claim 10 in which said sleep message further comprises a second data field, and said method further comprises the steps of:

operating said receiving mobile stations assigned to said first group in said sleep mode for a second time interval effective during the time period until the start of the next repetition of the overhead message train as determined by said second data field; and operating said receiving mobile stations assigned to said second group in said awake mode for the second time interval effective during the time period until the start of the next repetition of the overhead message train as determined by said second data field.

12. The method of claim 11 in which said sleep message further comprises a third data field, and said method further comprises the steps of:

operating said receiving mobile stations assigned to said first group in said sleep mode for a third time interval effective during the time period until the start of the next repetition of the overhead message train as determined by said third data field; and operating said receiving mobile stations assigned to said second group in said sleep mode for the third time interval effective during the time period until the start of the next repetition of the overhead message train as determined by said third data field.

13. The method of claim 12 in which said third time interval determined by said third field of bits ends concurrently with the beginning of a next repetition of the overhead message train.

14. The method of claim 12 in which said third time interval determined by said third field of bits ends concurrently with the end of a SPOM message.

15. The method of claim 12 in which said third time interval determined by said third field of bits ends concurrently with the start of a new sleep message.

16. The method of claim 10 in which said sleep message comprises a local control message.

17. The method of claim 10 in which said sleep message comprises a global action overhead message.

18. The method of claim 10 in which said mobile telecommunications system comprises an AMPS type system.

19. The method of claim 10 in which said mobile telecommunications system comprises a TACS system.

20. A method of reducing power consumption in a mobile station operating within a radio telecommunications system having a plurality of mobile stations assigned to a first or second group, and one or more base stations, said method comprising the steps of:

receiving at one of said plurality of mobile stations, a local control message transmitted in a repetitively broadcast overhead message train of a base station control channel, said local control message including local control bits comprising Local Control Option Code bits and a first data field;

determining that said local control message is a sleep message by examining the state of said Local Control Option Code bits;

operating said mobile station in an awake mode for a first time interval effective during a time period until a start of a next repetition of the overhead message train as determined by said first data field if said mobile station is assigned to said first group; and operating said mobile station in a sleep mode for the first time interval effective during the time period until the start of the next repetition of the overhead message train as determined by said first data field if said mobile station is assigned to said second group.

21. The method of claim 20 in which said local control bits of said local control message further comprise a second data field, and said method further comprises the steps of:

operating said mobile station in said sleep mode for a second time interval effective during the time period until the start of the next repetition of the overhead message train as determined by said second data field if said mobile station is assigned to said first group; and operating said mobile station in said awake mode for the second time interval effective during the time period until the start of the next repetition of the overhead message train as determined by said second data field if said mobile station is assigned to said second group.

22. The method of claim 21 in which said local control bits further comprise a third data field and said method further comprises the step of:

operating said mobile station in said sleep mode for a third time interval effective during the time period until the start of the next repetition of the overhead message train as determined by said third data field.

23. The method of claim 20 in which said mobile telecommunications system comprises an AMPS type system.

24. The method of claim 20 in which said mobile telecommunications system comprises a TACS system.

25. A method of reducing power consumption in a mobile station operating within a radio telecommunications system having a plurality of mobile stations assigned to a first or second group, and one or more base stations, said method comprising the steps of:

receiving at one of said plurality of mobile stations, a global action overhead message transmitted in a repetitively broadcast overhead message train of a base station control channel, said global action overhead message comprising Global Action Code bits and a first data field;

determining that said global action overhead message is a sleep message by examining said Global Action Code bits;

operating said mobile station in an awake mode for a first time interval effective during a time period until a start of a next repetition of the overhead message train as determined by said first data field if said mobile station is assigned to said first group; and operating said mobile station in a sleep mode for the first time interval effective during the time period until the start of the next repetition of the overhead message train as determined by said first data field if said mobile station is assigned to said second group.

26. The method of claim 25 in which said global action overhead message further comprises a second data field, and said method further comprises the steps of:

operating said mobile station in said sleep mode for a second time interval effective during the time period until the start of the next repetition of the overhead message train as determined by said second data field if said mobile station is assigned to said first group; and operating said mobile station in said awake mode for the second time interval effective during the time period until the start of the next repetition of the overhead message train as determined by said second data field if said mobile station is assigned to said second group.

27. The method of claim 26 in which said global action overhead message further comprises a third data field and said method further comprises the step of:

operating said mobile station in said sleep mode for a third time interval effective during the time period until the start of the next repetition of the overhead message train as determined by said third data field.

28. The method of claim 25 in which said mobile telecommunications system comprises an AMPS type system.

29. The method of claim 25 in which said mobile telecommunications system comprises a TACS system.

30. In a mobile station operating within a radio telecommunications system having one or more base stations and a plurality mobile station assigned to a plurality of sleep groups, a system for reducing mobile station battery power consumption, said system comprising:

means for receiving at said mobile station, a repetitively broadcast overhead message train transmitted on a base station control channel, said message train including a sleep message containing one or more data fields, said data fields including information indicating when mobile stations assigned to each sleep group of said plurality of sleep groups are to switch to a sleep mode and to an awake mode effective during a time period until a start of a next repetition of said message train; and means for operating said receiving mobile station in said sleep mode and said awake mode effective during the time period until the start of the next repetition of said message train in accordance with information contained in said data fields.

31. The system of claim 30 in which each of said plurality mobile stations is assigned to a first or second sleep group depending upon the numerical value of the next to the last bit of each of said mobile station's Mobile Station Identification Number.

32. The system of claim 30 wherein said sleep message is a local control message.

33. The system of claim 32 wherein said data fields are contained in the local control bits of said local control message.

34. The system of claim 30 wherein said sleep message is a global action overhead message.

35. The system of claim 30 wherein said data fields comprise a first, second and third field of bits and said plurality of sleep groups comprises a first and a second sleep groups, and said means for operating said receiving mobile station further comprises:

means for operating said receiving mobile station in said awake mode for a first time interval effective during the time period until the start of the next repetition of the overhead message train determined by said first field of bits and in said sleep mode for another time interval effective during the time period until the start of the next repetition of the overhead message train determined by said second and third fields of bits if said receiving mobile station is assigned to said first sleep group.

36. The system of claim 35 wherein said means for operating said receiving mobile station further comprises:

means for operating said receiving mobile station in said sleep mode for the first time interval effective during the time period until the start of the next repetition of the overhead message train determined by said first field of bits, in said awake mode for a second time interval effective during the time period until the start of the next repetition of the overhead message train determined by said second field of bits, and in said sleep mode for a third time interval effective during the time period until the start of the next repetition of the overhead message train determined by said third field of bits if said receiving mobile station is assigned to said second sleep group.

37. The system of claim 30 in which said radio telecommunications system comprises an AMPS type system.

38. The system of claim 30 in which said radio telecommunications system comprises a TACS system.

39. In a radio telecommunications system having one or more base stations and a plurality of mobile stations, a system for reducing power consumption in a mobile station, said system comprising:

means for assigning each of said plurality of mobile stations having a next to the last bit equal to 0 in its Mobile Station Identification Number to a first group and each of said plurality of mobile stations having a next to the last bit equal to 1 in its Mobile Station Identification Number to a second group;

means for receiving at each of said plurality of mobile stations, a sleep message transmitted in a repetitively broadcast overhead message train of a base station control channel, said sleep message comprising a first data field;

means for operating said receiving mobile stations assigned to said first group in an awake mode for a first time interval effective during a time period until a start of a next repetition of the overhead message train as determined by said first data field; and means for operating said receiving mobile stations assigned to said second group in a sleep mode for the first time interval effective during the time period until the start of the next repetition of the overhead message train as determined by said first data field.

40. The system of claim 39 in which said sleep message further comprises a second data field, and said system further comprises:

means for operating said receiving mobile stations assigned to said first group in said sleep mode for a second time interval effective during the time period until the start of the next repetition of the overhead message train as determined by said second data field; and means for operating said receiving mobile stations assigned to said second group in said awake mode for the second time interval effective during the time period until the start of the next repetition of the overhead message train as determined by said second data field.

41. The system of claim 40 in which said sleep message further comprises a third data field, and said system further comprises:

means for operating said receiving mobile stations assigned to said first group in said sleep mode for a third time interval effective during the time period until the start of the next repetition of the overhead message train as determined by said third data field; and means for operating said receiving mobile stations assigned to said second group in said sleep mode for the third time interval effective during the time period until the start of the next repetition of the overhead message train determined by said third data field.

42. The system of claim 41 in which said third time interval determined by said third field of bits ends concurrently with the beginning of a next repetition of the overhead message train.

43. The system of claim 41 in which said third time interval determined by said third field of bits ends concurrently with the end of a SPOM message.

44. The system of claim 41 in which said third time interval determined by said third field of bits ends concurrently with the start of another sleep message.

45. The system of claim 39 in which said sleep message comprises a local control message.

46. The system of claim 39 in which said sleep message comprises a global action overhead message.

47. The system of claim 39 in which said radio telecommunications system comprises an AMPS type system.

48. The system of claim 39 in which said radio telecommunications system comprises a TACS system.

49. In a radio telecommunications system having a plurality mobile stations assigned to a first or second group, and one or more base stations, a system for reducing power consumption in a mobile station, said system comprising:

means for receiving at one of said plurality of mobile stations a local control message transmitted in a repetitively broadcast overhead message train of a base station control channel, the local control bits of said local control message comprising Local Control Option Code bits and a first data field;

means for determining that said local control message is a sleep message-by examining the state of said Local Control Option Code bits;

means for operating said mobile station in an awake mode for a first time interval effective during a time period until a start of a next repetition of the overhead message train as determined by said first data field if said mobile station is assigned to said first group; and means for operating said mobile station in a sleep mode for the first time interval effective during the time period until the start of the next repetition of the overhead message train as determined by said first data field if said mobile station is assigned to said second group.

50. The system of claim 49 in which said local control bits of said local control message further comprise a second data field, and said system further comprises:

means for operating said mobile station in said sleep mode for a second time interval effective during the time period until the start of the next repetition of the overhead message train as determined by said second data field if said mobile station is assigned to said first group; and means for operating said mobile station in said awake mode for the second time interval effective during the time period until the start of the next repetition of the overhead message train as determined by said second data field if said mobile station is assigned to said second group.

51. The system of claim 50 in which said local control bits further comprise a third data field and said system further comprises:

means for operating said mobile station in said sleep mode for a third time interval effective during the time period until the start of the next repetition of the overhead message train as determined by said third data field.

52. The system of claim 49 in which said radio telecommunications system comprises an AMPS type system.

53. The system of claim 49 in which said radio telecommunications system comprises a TACS system.

54. In a radio telecommunications system having a plurality of mobile stations assigned to a first or second group, and one or more base stations, a system of reducing power consumption in a mobile station, said system comprising:

means for receiving at one of said plurality of mobile stations, a global action overhead message transmitted in a repetitively broadcast overhead message train of a base station control channel, said global action overhead message comprising Global Action Code bits and a first data field;

means for determining that said global action overhead message is a sleep message by examining said Global Action Code bits;

means for operating said mobile station in an awake mode for a first time interval effective during a time period until a start of a next repetition of the overhead message train as determined by said first data field if said mobile station is assigned to said first group; and means for operating said mobile station in a sleep mode for the first time interval effective during the time period until the start of the next repetition of the overhead message train as determined by said first data field if said mobile station is assigned to said second group.

55. The system of claim 54 in which said global action overhead message further comprises a second data field, and said system further comprises:

means for operating said mobile station in said sleep mode for a second time interval effective during the time period until the start of the next repetition of the overhead message train as determined by said second data field if said mobile station is assigned to said first group; and means for operating said mobile station in said awake mode for the second time interval effective during the time period until the start of the next repetition of the overhead message train as determined by said second data field if said mobile station is assigned to said second group.

56. The system of claim 55 in which said global action overhead message further comprises a third data field and said system further comprises:

means for operating said mobile station in said sleep mode for a third time interval effective during the time period until the start of the next repetition of the overhead message train as determined by said third data field.

57. The system of claim 54 in which said radio telecommunications system comprises an AMPS type system.

58. The system of claim 54 in which said radio telecommunications system comprises a TACS system.

* * * * *